United States Patent
Dagorn

(10) Patent No.: US 8,348,658 B2
(45) Date of Patent: Jan. 8, 2013

(54) BLOW-MOLD ASSEMBLY FOR THE MANUFACTURING OF CONTAINERS, INCLUDING A MOLD AND A PLUG FOR FLUID CONNECTION

(75) Inventor: Daniel Dagorn, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 548 days.

(21) Appl. No.: 12/374,631

(22) PCT Filed: Jul. 17, 2007

(86) PCT No.: PCT/FR2007/001219
§ 371 (c)(1),
(2), (4) Date: Dec. 3, 2009

(87) PCT Pub. No.: WO2008/009808
PCT Pub. Date: Jan. 24, 2008

(65) Prior Publication Data
US 2010/0104681 A1    Apr. 29, 2010

(30) Foreign Application Priority Data
Jul. 21, 2006   (FR) ...................................... 06 06642

(51) Int. Cl.
*B29C 49/64*      (2006.01)
(52) U.S. Cl. ............................. 425/195; 249/79; 425/526
(58) Field of Classification Search .................. 425/182, 425/195, 526; 249/79
See application file for complete search history.

(56) References Cited

U.S. PATENT DOCUMENTS

| | | | | |
|---|---|---|---|---|
| 4,408,521 A | * | 10/1983 | Schelli et al. | ............. 100/229 R |
| 4,702,685 A | * | 10/1987 | Fruntzek | ........................ 425/182 |
| 5,686,122 A | | 11/1997 | Huntington et al. | |
| 6,036,469 A | | 3/2000 | Allen et al. | |
| 6,444,159 B2 | * | 9/2002 | Petre | .............................. 264/520 |
| 6,447,281 B1 | | 9/2002 | Petre | |
| 6,948,924 B2 | * | 9/2005 | Tsau et al. | ..................... 425/195 |
| 7,377,766 B2 | | 5/2008 | Lemaistre et al. | |

FOREIGN PATENT DOCUMENTS

| | | | |
|---|---|---|---|
| DE | 3127797 A | * | 2/1983 |
| DE | 36 13 543 C1 | | 12/1986 |
| DE | 35 29 052 A1 | | 2/1987 |

(Continued)

OTHER PUBLICATIONS

Partial machine translation of EP69919A dated Jan. 1983 obtained from the espacenet website.*

(Continued)

*Primary Examiner* — Robert B Davis
(74) *Attorney, Agent, or Firm* — Sughrue Mion, PLLC

(57) ABSTRACT

A Blow-mold assembly for the manufacturing of containers, comprising:
  A mold having a sidewall defining a mold cavity and provided with a channel for the circulation of a heating or cooling fluid, said channel having, on an outer face of the mold, an fluid inlet port and a fluid outlet port;
  A plug provided with a fluid supply line and a fluid discharge line;
Wherein said mold and said plug are provided with complementary connection elements configured to provide removable connection of the plug to the mold with simultaneous connection of the supply line to the inlet port and connection of the discharge line to the outlet port.

15 Claims, 7 Drawing Sheets

FOREIGN PATENT DOCUMENTS

| | | | |
|---|---|---|---|
| DE | 203 18 583 U1 | | 1/2005 |
| EP | 69919 A | * | 1/1983 |
| FR | 2 856 333 A1 | | 12/2004 |
| JP | 63-072515 A | | 4/1988 |
| SU | 1572744 A | * | 6/1990 |
| WO | 2005/002820 A1 | | 1/2005 |

OTHER PUBLICATIONS

International Search Report for PCT/FR2007/001219, mailed Dec. 27, 2007.

* cited by examiner

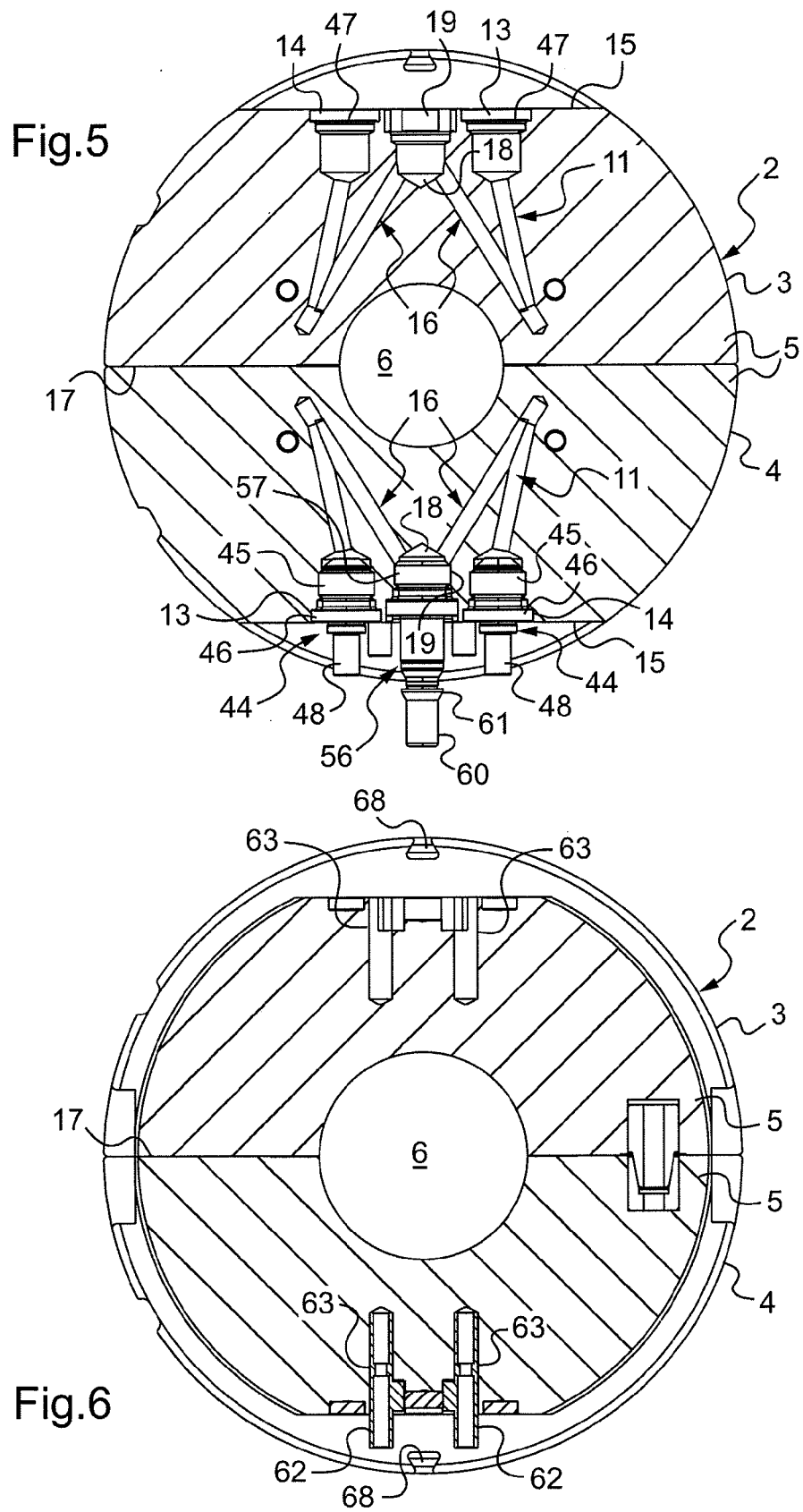

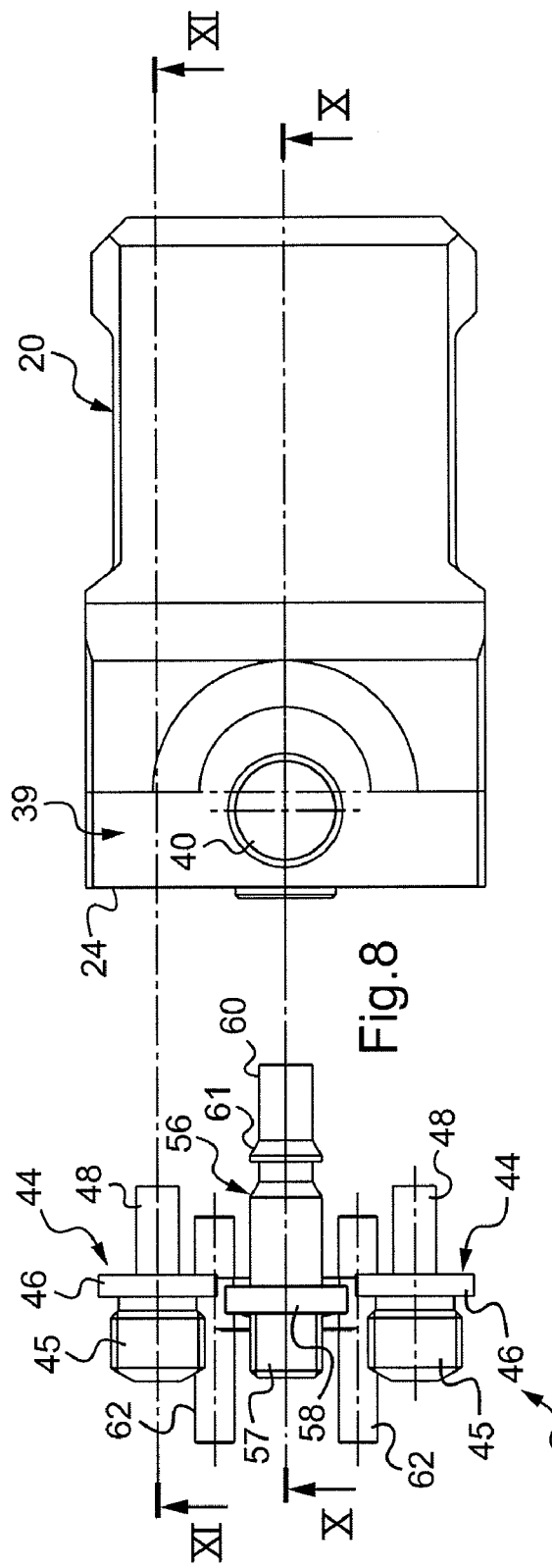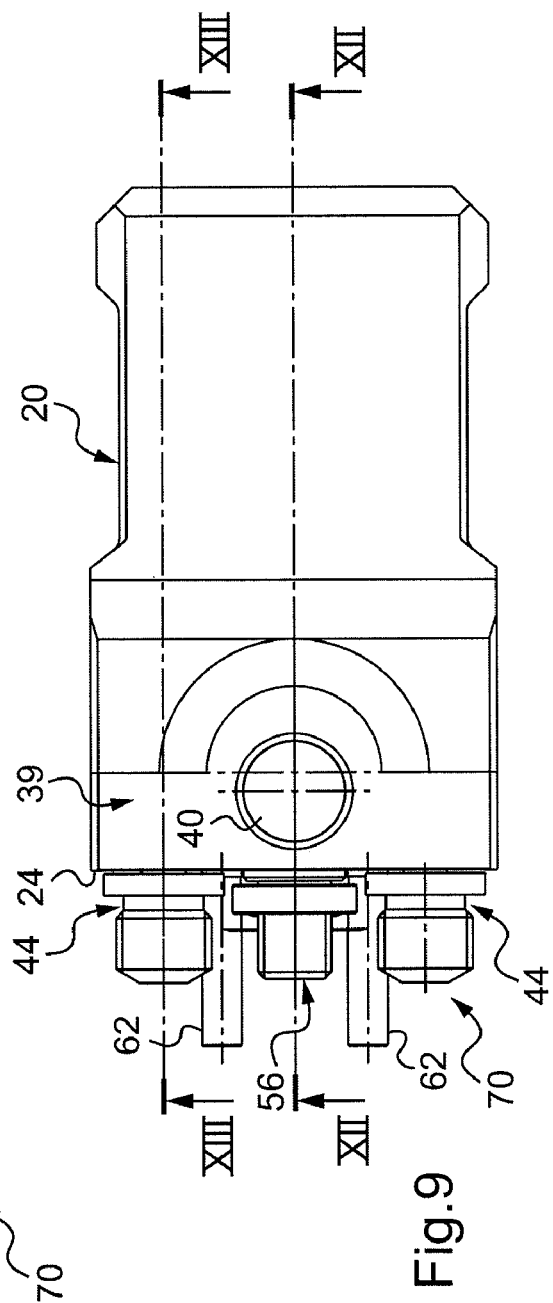

BLOW-MOLD ASSEMBLY FOR THE MANUFACTURING OF CONTAINERS, INCLUDING A MOLD AND A PLUG FOR FLUID CONNECTION

FIELD OF THE INVENTION

The invention relates to the blow molding of containers from parisons usually made of thermoplastic material such as PET.

BACKGROUND OF THE INVENTION

The blowing of a container is achieved in a mold the wall of which defines a cavity in which the parison is introduced. During the blowing process, the parison molds the shape of the wall under the high gaseous pressure within the parison, after it has been heated in order to allow for its plastic deformation.

It is known to equip the mold with a thermal regulation system. Depending upon the targeted uses of the containers, either the mold is cooled in order to maintain its temperature at a level lower than the temperature of vitreous transition (e.g. in the manufacturing of containers suitable for receiving still water, wherein the mold is maintained within the range of 20-60° C.), or the mold is heated to temperatures greater than the temperature of vitreous transition, in order for the material to have a crystallinity great enough, such that the container is made resistant to deformation during a hot filling (such containers are called "heat resistant" or "HR").

Thermal regulation is achieved through circulation of a cooling or heating fluid (e.g. water or oil) in at least one channel formed within the sidewall of the mold. Depending upon the extent of the thermal regulation, either of a part of the mold only or of the whole mold, the channel may extend on the whole height of the mold, or be localized in a specific area (such as in the vicinity of the neck or the bottom of the container).

In general, the channel opens on an outer face of the mold and has an inlet port connected to a fluid supply line, and an outlet port connected to a fluid discharge line. Circulation of the fluid is achieved through a pump located outside the mold. During the setting process, including the replacement of the mold, the inlet and discharge lines need to be disconnected from the mold to be replaced, and connected back to the new mold.

U.S. Pat. No. 6,444,159 and U.S. Pat. No. 6,447,281 to Sidel, Inc. give an overview of this technology, which, in the inventors' opinion, is satisfactory but needs to be enhanced, for the connection of the supply and discharge lines to the mold is somewhat unpractical.

SUMMARY OF THE INVENTION

It is an object of the invention to facilitate the connection and disconnection of the fluid supply and discharge lines.

According to a first aspect, the invention provides a blow-mold assembly for the manufacturing of containers, comprising:

A mold having a sidewall defining a mold cavity and provided with a channel for the circulation of a heating or cooling fluid, said channel having, on an outer face of the mold, an fluid inlet port and a fluid outlet port;
A plug provided with a fluid supply line and a fluid discharge line;
wherein said mold and said plug are provided with complementary connection elements configured to provide removable connection of the plug to the mold with simultaneous connection of the supply line to the inlet port and connection of the discharge line to the outlet port.

Accordingly, the fluid connection of the mold can be achieved in a single gesture consisting in fitting the plug to the mold, whereby the connecting operations are simplified, and whereby time is spared during the setting process.

In a preferred embodiment, said mold and said plug are provided with complementary fluid connection elements, and with complementary mechanical connection elements distinct from the fluid connection elements.

In a preferred embodiment, the mold is provided with a male mechanical connection part, e.g. under the form of a nozzle, and the plug is provided with a complementary female mechanical connection part, e.g. under the form of a hole including a movable surface for removably engaging said nozzle. Said surface may be provided on a button slidingly mounted with respect of said hole, whereas said nozzle may comprise an annular bead for engaging a counterbore formed within said button.

In a further preferred embodiment, the mold comprises a male fluid coupling part, e.g. under the form of a nozzle having a protruding jacket, whereas said plug comprises a complementary female fluid coupling part, e.g. under the form of an aperture provided with a plugging mechanism which is movable under removable insertion of said jacket within said aperture.

The mold and plug may also comprise complementary electrical connection elements including, on the one hand, a pair of electrical terminals provided on the mold and possibly connected to the conductors of a thermal converter mounted on the mold for measuring a temperature thereof, and on the other hand a pair of electrical connectors provided on the plug, whereby fluid connection and electrical connection are achieved simultaneously.

According to a second aspect, the invention provides a blow-mold for the manufacturing of containers, said mold comprising a cylindrical sidewall defining a mold cavity and provided with a channel for the circulation of a heating or cooling fluid, said channel having a fluid inlet port and a fluid outlet port, said mold further including:

Fluid connection elements provided within said inlet and outlet ports, said inlet and outlet port being formed in the sidewall of the mold from a planar surface formed in an outer surface of the mold;
Mechanical connection elements provided on said planar surface, wherein said mechanical connection elements are distinct from said fluid connection elements.

Said mechanical elements are preferably located in a close vicinity of said fluid connection elements.

In a particular embodiment, the mechanical connection elements comprise a nozzle including a protruding pin having an annular bead.

The fluid connection elements comprise e.g. nozzles provided with jackets protruding from said planar surface.

Furthermore, the mold may comprise electrical connection elements located in a close vicinity of said fluid and mechanical connection elements.

The above and other objects and advantages of the invention will become apparent from the detailed description of preferred embodiments, considered in conjunction with the accompanying drawings.

BRIEF DESCRIPTION OF THE DRAWINGS

FIG. 5 is a cross-sectional view of the mold of FIG. 2 along line V-V.

FIG. 6 is a cross-sectional view of the mold of FIG. 2 along line VI-VI.

FIG. 8 is a top view of the plug and fastening system of FIG. 7.

FIG. 9 is view similar to FIG. 9, in a connected configuration.

DESCRIPTION OF PREFERRED EMBODIMENTS

Figure 1:
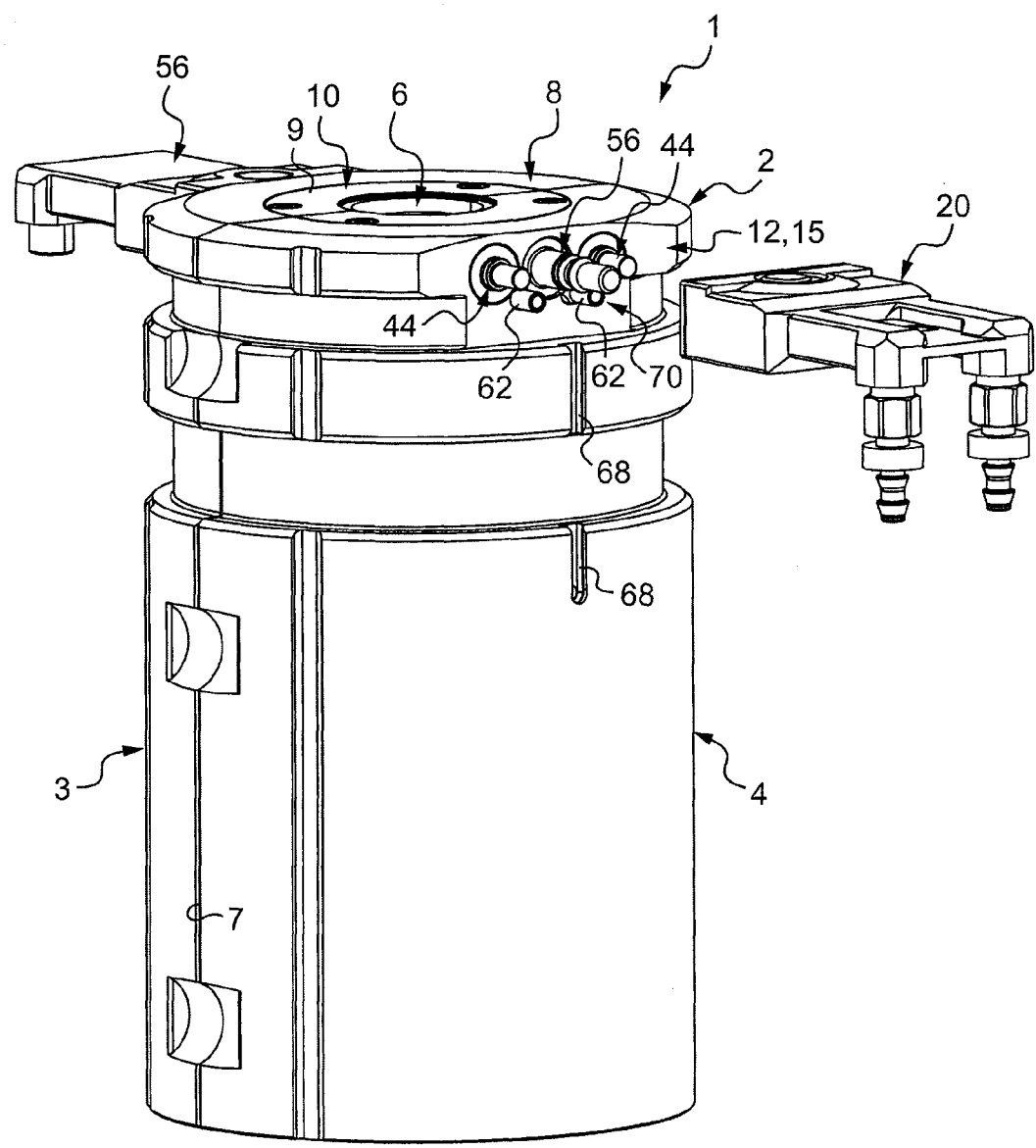
FIG. 1 is a perspective view of an blow-mold assembly for the manufacturing of containers, including a blow mold and a pair of plugs for the connection of lines for the supply and discharge of a cooling or heating fluid.
Figure 2:
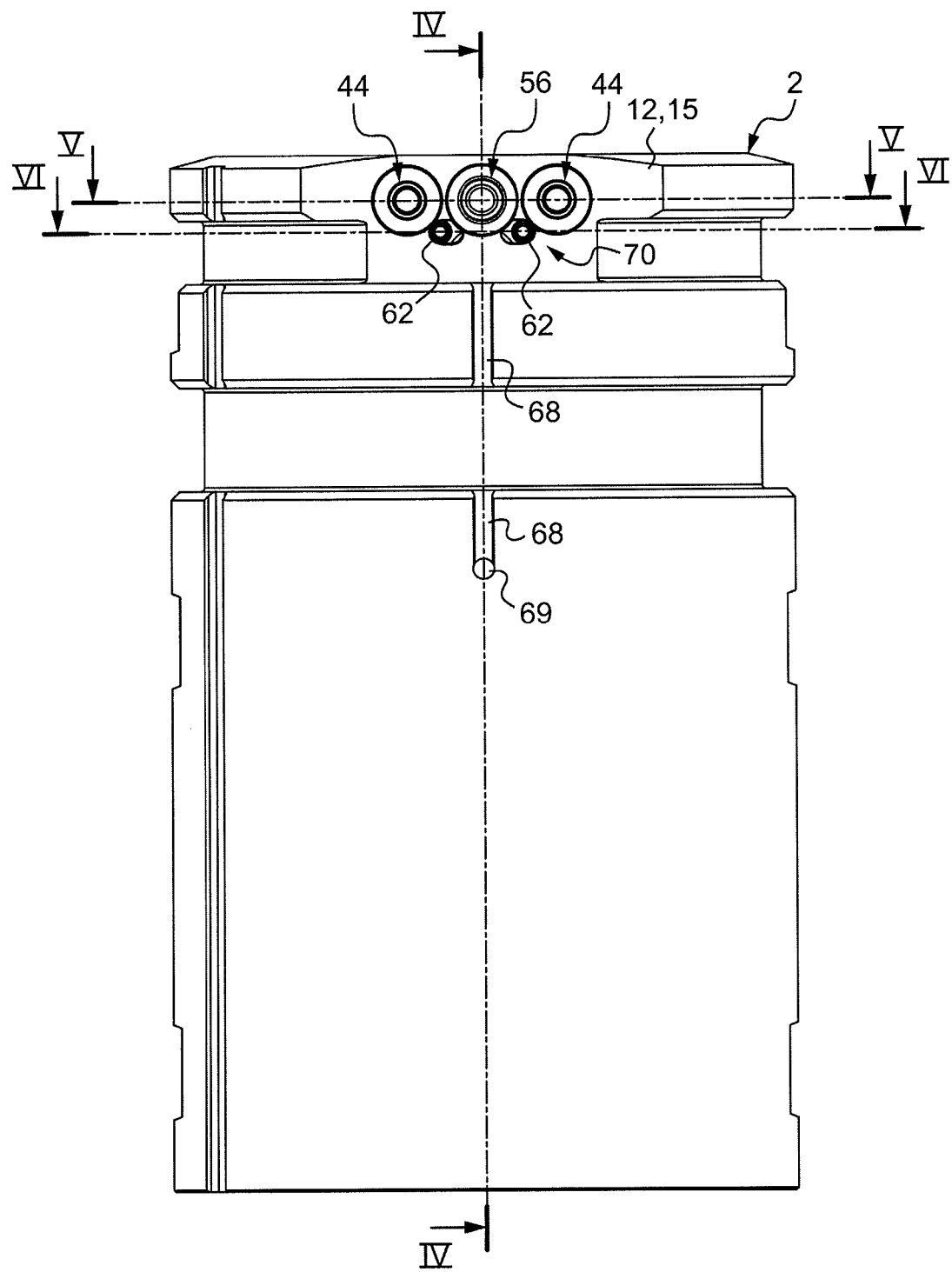
FIG. 2 is a planar elevational view of the mold of FIG. 1.

Referring now to FIG. 1, there is shown an assembly 1 for the manufacturing of containers. This assembly 1 comprises a mold 2 including two half-mold shells 3, 4 which are substantially symmetrical in shape and made of metal (e.g. steel or aluminum alloy). The shells 3, 4 together form a sidewall 5 which is globally cylindrical around a main axis A and defines, on an inner face, a cavity 6. Cavity 6 defines the shape of a container to be blow-molded or stretch-blow molded in the cavity 6 from a parison made of plastic, which has been previously heated at a temperature greater than its temperature of vitreous transition. The shells 3, 4 are movable with respect of each other along a hinge 7 to permit the opening of the mold 2 and allow introduction of a parison. A mold bottom (not disclosed) is inserted between the shells 3, 4 to form the container bottom.

The overall structure of such a mold 2, called "wallet mold", is disclosed in French Patent application No. 2 856 333 and in corresponding international PCT application No. WO 05/002820, both in the name of SIDEL, to which the skilled person shall refer.

At an upper end 8, which corresponds to a neck of the container to be molded, the mold 2 comprises a plate 9, formed of two symmetrical parts each mounted on a respective shell 3, 4. The plate 9 has an upper face 10 on which a blowing duct (not disclosed) rests for supplying pressurized air for the blow molding of the container.

As depicted on FIG. 5, the sidewall 5 includes, in the vicinity of its upper end 5, two channels 11 provided in each shell 3, 4 to allow the circulation within the sidewall 5 of a fluid for the cooling or heating thereof.

Each channel 11 opens, on an outer face 12 of the mold, at an inlet port 13 through which the fluid is supplied, and at a outlet port 14, through which the fluid is discharged after it has undergone thermal exchange with the sidewall 5. As depicted on FIG. 5, ports 13, 14 are located in a close vicinity of each other. Ports 13, 14 are drilled in the sidewall 5, starting from a planar surface 15 formed within the outer face 12 of the mold 2 parallel to the main axis A. Each channel 11 extends in a transversal plane perpendicular to the main axis A, has a W shape and includes two V-shaped sections 16 which start from a port 13, 14, extend to the vicinity of a mold parting plane 17 and connect to each other in a common intermediate chamber 18 formed by an end of a central bore 19 drilled in the planar surface 15 between the inlet port 13 and the outlet port 14.

The assembly 1 further comprises a plug 20 under the form of a housing in which a fluid supply line 21 and a fluid discharge line 22 are formed. The lines 21, 22 have substantially parallel main sections 23 which open on a front face 24 of the plug 20 at two apertures 25, 26 the interaxial distance of which is equal to the interaxial distance between the ports 13, 14. The lines 21, 22 both have, opposite to the front face 24, secondary sections 27, which form an extension of the main sections 23 perpendicular thereto and are partly formed within nozzles 28 on which flexible ducts (non depicted) are mounted for the supplying and discharging of the fluid.

Figure 11:
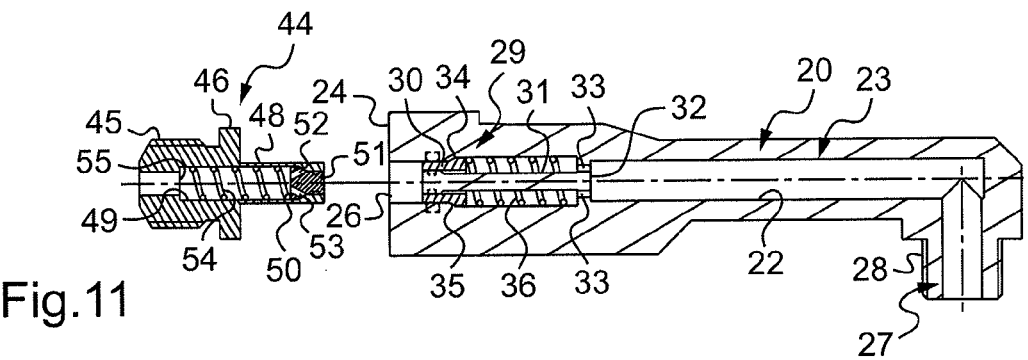
FIG. 11 is a cross-sectional view of the plug and fastening system of FIG. 8 along line XI-XI.
Figure 12:
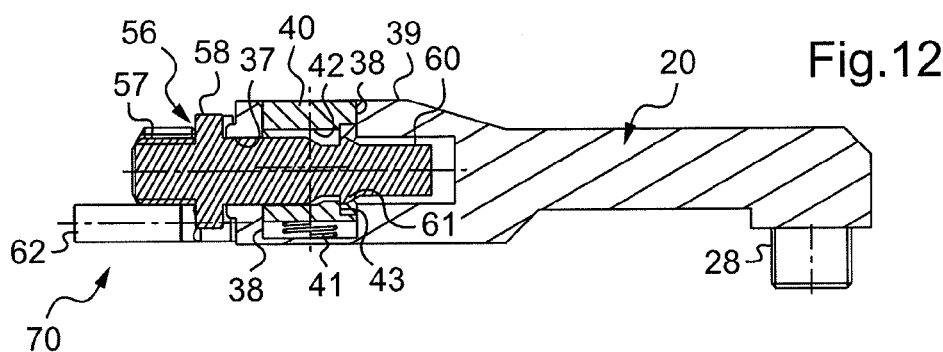
FIG. 12 is a cross-sectional view of the plug and fastening system of FIG. 9 along line XII-XII.
Figure 13:
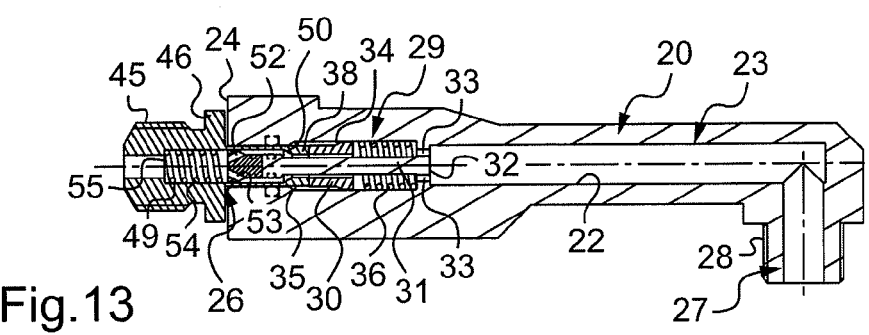
FIG. 13 is a cross-sectional view of the plug and fastening system of FIG. 9 along line XIII-XIII.

The plug 20 includes a plugging mechanism 29 for plugging each line 21, 22. The plugging mechanism 29 comprises a cylindrical valve 30 mounted on a rod 31 which extends coaxially with respect of the line 21, 22 from a wall 32 provided with holes 33, towards the aperture 25, 26. The valve 30 has a conical print surface 34 configured to abut against a complementary conical valve seat 35, formed in the line 21, 22. The valve 30 is slidingly mounted on the rod 31 between a plugging position (FIG. 11) wherein the print surface 34 abuts against the valve seat 35, thereby preventing the fluid from flowing, and an open position (FIG. 13) wherein the valve 30 is spaced from the valve seat 35, thereby allowing the fluid to flow. Valve 30 is permanently biased by a return spring 36 interposed between the valve 30 and the wall 32.

Figure 10:
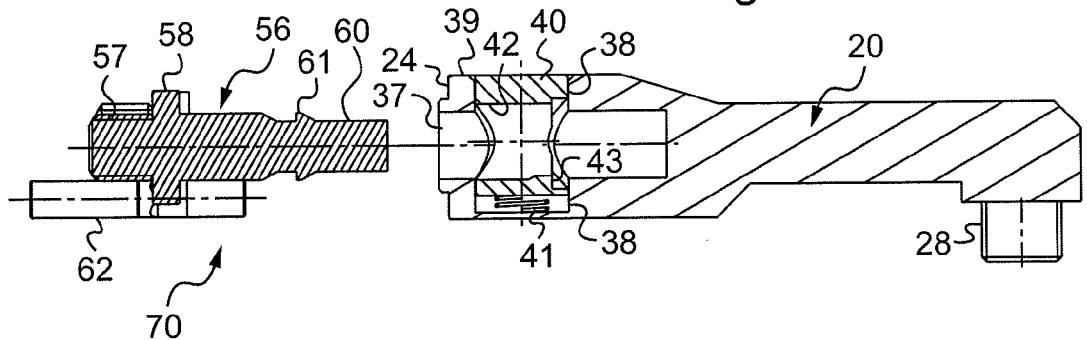
FIG. 10 is a cross-sectional view of the plug and fastening system of FIG. 8 along line X-X.

The plug 20 comprises, between the apertures 25, 26, a central hole 37 drilled perpendicular to the front face 24. A bore 38 is drilled in the plug 20 starting from an upper face 39, perpendicular to the hole 37 which it intersects. A button 40 is mounted within the bore 38. A compression return spring 41 is mounted between an inner end of the button 40 and a bottom surface of the bore 38. As depicted on FIG. 10, the button 40 has a bore 42 which is substantially coaxial to the hole 37 and which forms a continuous extension thereof. At an end of the bore 42, opposite to the front face 24, the bore 42 has a counterbore 43.

Each shell 3, 4 is provided with a pair of fluid coupling nozzles 44, each mounted within a port 13, 14 of the channel 11. Each nozzle 44 includes a threaded body 45 screwed in the corresponding port 13, 14, a flange 46 which is housed in a complementary counterbore 47 formed around the port 13, 14 in order to ensure correct depth positioning of the nozzle 44 with respect of the sidewall 5, and a cylindrical jacket 48 which, after the nozzle 44 is mounted, protrudes from the planar surface 15. The nozzle 44 is provided with a through-hole 49 which extends from a free end of the jacket 48 where the hole has a conical shoulder 50 forming a valve seat, to an opposite end of the body 45 where the hole 49 opens in the channel 11.

A valve flap 51, provided with a conical print surface 52 and with inclined through-holes 53 opening on the print surface 52 and on a back face of the valve flap 51, is slidingly mounted within the hole 49, between a plugging position (FIG. 11) wherein the conical print surface 52 abuts against the valve seat 50, thereby preventing the fluid from flowing through the hole 49, and an open position (FIG. 13) wherein the valve flap 51 is spaced from the valve seat 50 thereby allowing the fluid to flow through the hole 49. Valve flap 51 is permanently biased by a return spring 54 interposed between the valve flap 51 and a shoulder 55 formed within the hole 49.

Each shell 3, 4 is further provided with a mechanical coupling nozzle 56, distinct from the fluid coupling nozzles 44 and comprising a threaded portion 57 screwed in the central bore 19, a flange 58 which is housed in a complementary counterbore 59 formed around the port bore 19 in order to ensure correct positioning of the nozzle 56, and a cylindrical pin 60 having an annular bead 61 on is outer surface.

Starting from a configuration wherein the mold 2 and a plug 20 are initially disconnected (as depicted on the right, in an upper part of FIG. 1), the coupling of the mold 2 and plug 20 is achieved by fitting the plug 20 onto the nozzles 44, 56, whereby the mechanical coupling nozzle 56 fits within the central hole 37 of the plug 20 whereas the fluid coupling nozzles 44 fit in the apertures 25, 26 until the plug 20 is clipped onto the mold. The clipping is achieved through the following operations: the bead 61 passes the counterbore 43, slips against a bossing formed within the bore 42, presses the button 40 against the return spring 41 and engages the counterbore 43 without return, except manual pressure on the button 40 against its return spring 41.

At the same time, fluid connection is achieved simultaneously and sealingly, on the one hand between the supply line 21 and the inlet port 13 and, on the other hand, between the discharge line 22 and the outlet port 14. As depicted on FIG. 13, the jacket 48 boxes the valve 30 to its open position against the return spring 36, whereas the rod 31 boxes the valve flap 51 to its open position against the return spring 54. In this open configuration, the fluid can freely flow from the supply line 21 to the channel 11 and to the discharge line 22 through each hole 33, 49, 53.

The plug 20 is thereby removably fastened to the mold 2. In order to disconnect the plug 20 from the mold 2, a pressure shall be applied on the button 40, whereby the bead 61 is disconnected from the mechanical coupling nozzle 56, and the plug 20 shall be withdrawn in a direction parallel to the axes of the lines 21, 22. During withdrawal of the plug 20, the valve 30 and the valve flap 51 move back to their initial plugging position, thereby preventing any fluid leak.

The hereabove prescriptions are simple, and allow for fluid connection of the mold in a single gesture in which the plug 20 is simply fitted to the nozzles 44, 56 and removably clipped onto the nozzle 56.

It shall be understood from the hereabove description that the mechanical and fluid connection means of the plug 20 to the mold 2 have a male part (formed by the nozzles 44, 56) provided on the mold 2, and a female part (formed by the apertures 25, 26 and the central hole 37) provided on the plug 20. Of course, inversion of such a structure is achievable, whereby the mold 2 is provided with the female part whereas the plug 20 is provided with a complementary male part.

Figure 3:
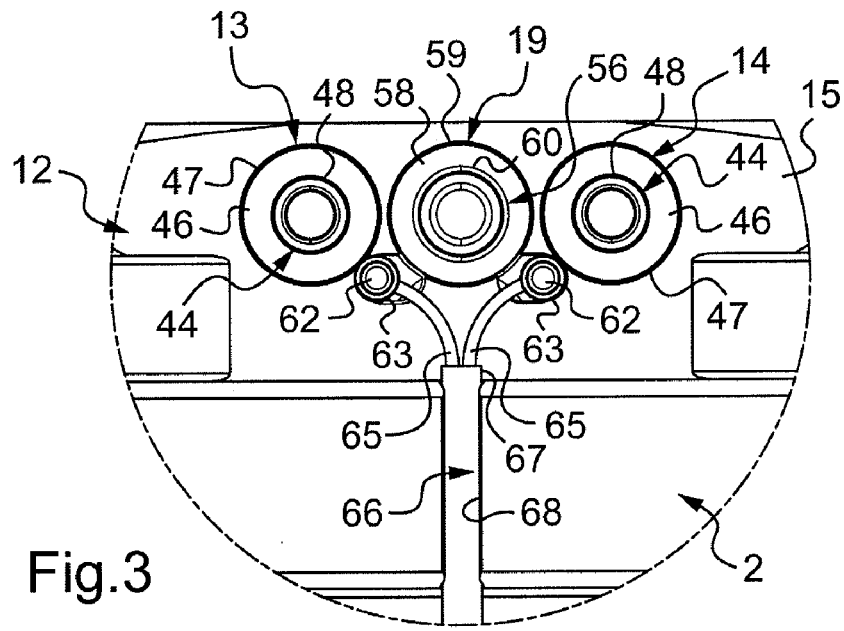
FIG. 3 is a detailed view of the mold of FIG. 2.
Figure 7:
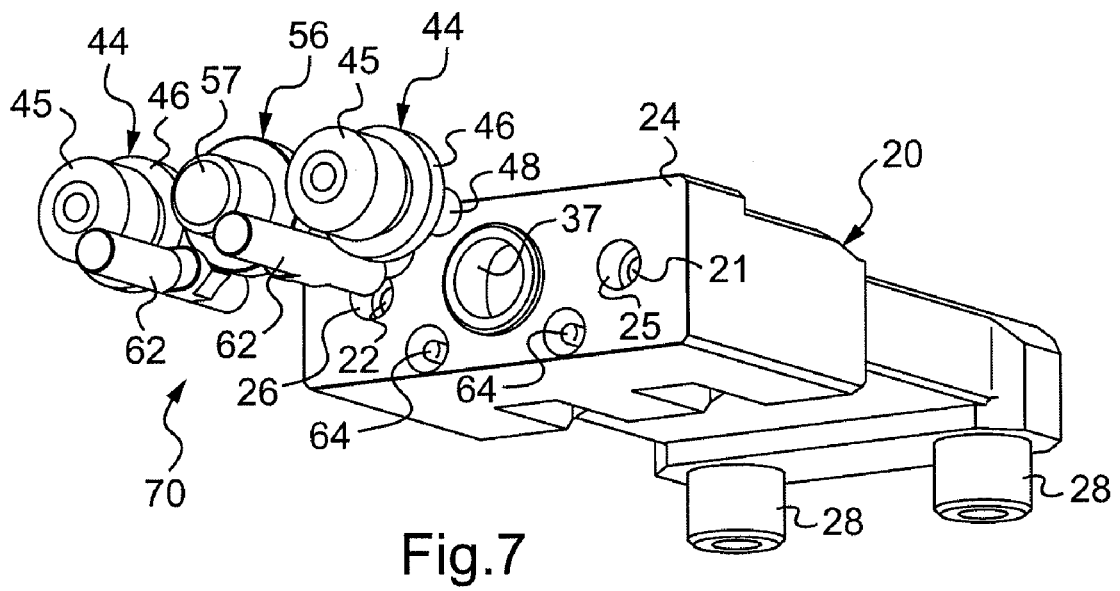
FIG. 7 is an exploded perspective view showing a plug and a removable fastening system thereof onto the mold, in a disconnected configuration.
Figure 4:
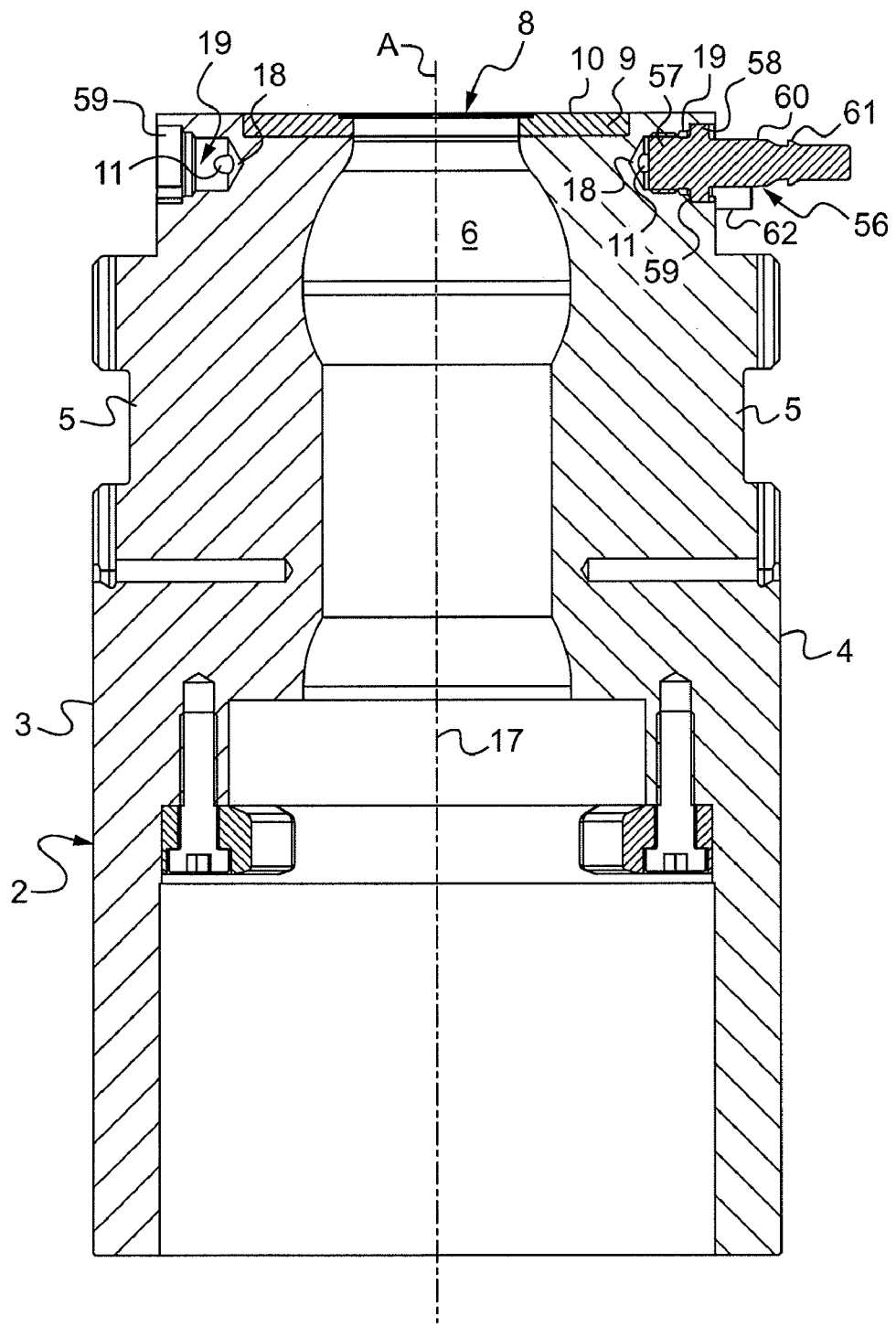
FIG. 4 is a cross-sectional view of the mold of FIG. 2 along line IV-IV.

According to one particular embodiment, the mold 2 is provided with an instrumentation, such as a temperature probe, requiring electrical supply. To this end, the mold 2 may be equipped with electrical terminals 62 under the form of metallic sleeves fitted within two drills 63 formed within each shell 3, 4 in the close vicinity of the nozzles 44, 56, as depicted on FIG. 3. Like the fluid supply, the electrical supply of the mold 2 is achieved through the plug 20, which is provided with electrical connectors 64. When the plug 20 is connected to the mold 2, the connectors 64 are housed in the terminals 62. Each connector 64 is connected to an electrical cable (non disclosed) which ensures electrical connection to a low voltage generator located outside the assembly 1. Two electrical conductors 65 are connected to the terminals 62. The conductors 65 together form a thermal converter 66 which is partly housed in a silicon sleeve 67 received within a groove 68 of trapezoidal section. A stripped end (non visible) of the thermal converter 66 forms a probe inserted in a drill 69 formed in the sidewall 5, whereby the probe measures the temperature of the mold in the vicinity of the cavity 6.

In the depicted embodiment, the nozzles 44, 56 and the terminals 62 together form, in a local area of the mold 2, a triple-function receptacle 70: mechanical connection, fluid connection, electrical connection, to which the plug 20 is fitted. The plug 20 is compact enough to be held in one hand only. One single gesture is sufficient to clip the plug 20 to the receptacle 70, thereby achieving simultaneously the triple function.

The invention claimed is:

1. A blow-mold assembly for the manufacturing of containers, comprising:
   a mold globally cylindrical around a main axis having a sidewall defining a mold cavity and provided with a channel for the circulation of a heating or cooling fluid, said channel having, on an outer face of the mold, an fluid inlet port and a fluid outlet port;
   a plug provided with a fluid supply line and a fluid discharge line;
   wherein said mold and said plug are provided with complementary connection elements configured to provide removable connection of the plug to the mold with simultaneous connection of the supply line to the inlet port and connection of the discharge line to the outlet port, said inlet port and said outlet port extend in said sidewall starting from a planar surface formed within said outer face of the mold and parallel to said main axis.

2. The blow-mold assembly according to claim 1, wherein said mold and said plug are provided with complementary fluid connection elements and with complementary mechanical connection elements distinct from the fluid connection elements.

3. The blow-mold assembly according to claim 1, wherein said mold is provided with a male mechanical connection part, and wherein the plug is provided with a complementary female mechanical connection part.

4. The blow-mold assembly according to claim 3, wherein said mold comprises a nozzle, and wherein the plug comprises a hole including a movable surface for removably engaging said nozzle.

5. The blow-mold assembly according to claim 4, wherein said surface is provided on a button slidingly mounted with respect of said hole.

6. The blow-mold assembly according to claim 5, wherein said nozzle comprises an annular bead for engaging a counterbore formed within said button.

7. The blow-mold assembly according to claim 1, wherein said mold comprises a male fluid coupling part, and wherein said plug comprises a complementary female fluid coupling part.

8. The blow-mold assembly according to claim 7, wherein said mold comprises a nozzle having a protruding jacket, and wherein said plug comprises an aperture provided with a plugging mechanism which is movable under removable insertion of said jacket within said aperture.

9. The blow-mold assembly according to claim 1, wherein said mold and plug further comprise complementary electrical connection elements
   including a pair of electrical terminals provided on the mold and a pair of electrical connectors provided on the plug.

10. The blow-mold according to claim 9, wherein said electrical terminals are connected to a thermal converter mounted on the mold for measuring a temperature thereof.

11. A blow-mold for the manufacturing of containers, said mold extends around a main axis and comprises a cylindrical sidewall defining a mold cavity and is provided with a channel for the circulation of a heating or cooling fluid, said channel having an fluid inlet port and an fluid outlet port, said mold further including:
   fluid connection elements provided within said inlet and outlet ports, said inlet and outlet port being formed in the sidewall of the mold from a planar surface formed in an outer surface of the mold;
   mechanical connection elements provided on said planar surface, wherein said mechanical connection elements are distinct from said fluid connection elements;
   wherein said inlet port and said outlet port extend in said sidewall starting from a planar surface formed within said outer face of the mold and parallel to said main axis.

12. The blow-mold according to claim 11, wherein said mechanical elements are located in a close vicinity of said fluid connection elements.

13. The blow-mold according to claim 11, wherein said mechanical connection elements comprise a nozzle including a protruding pin having an annular bead.

14. The blow-mold according to claim 11, wherein said fluid connection elements comprise nozzles provided with jackets protruding from said planar surface.

15. The blow-mold according to claim 11, further comprising electrical connection elements located in a close vicinity of said fluid and mechanical connection elements.

* * * * *